Feb. 7, 1928.
L. GILLIG ET AL
1,658,595
SLIDING WINDOW FOR MOTOR VEHICLES
Filed July 19, 1921    2 Sheets-Sheet 1
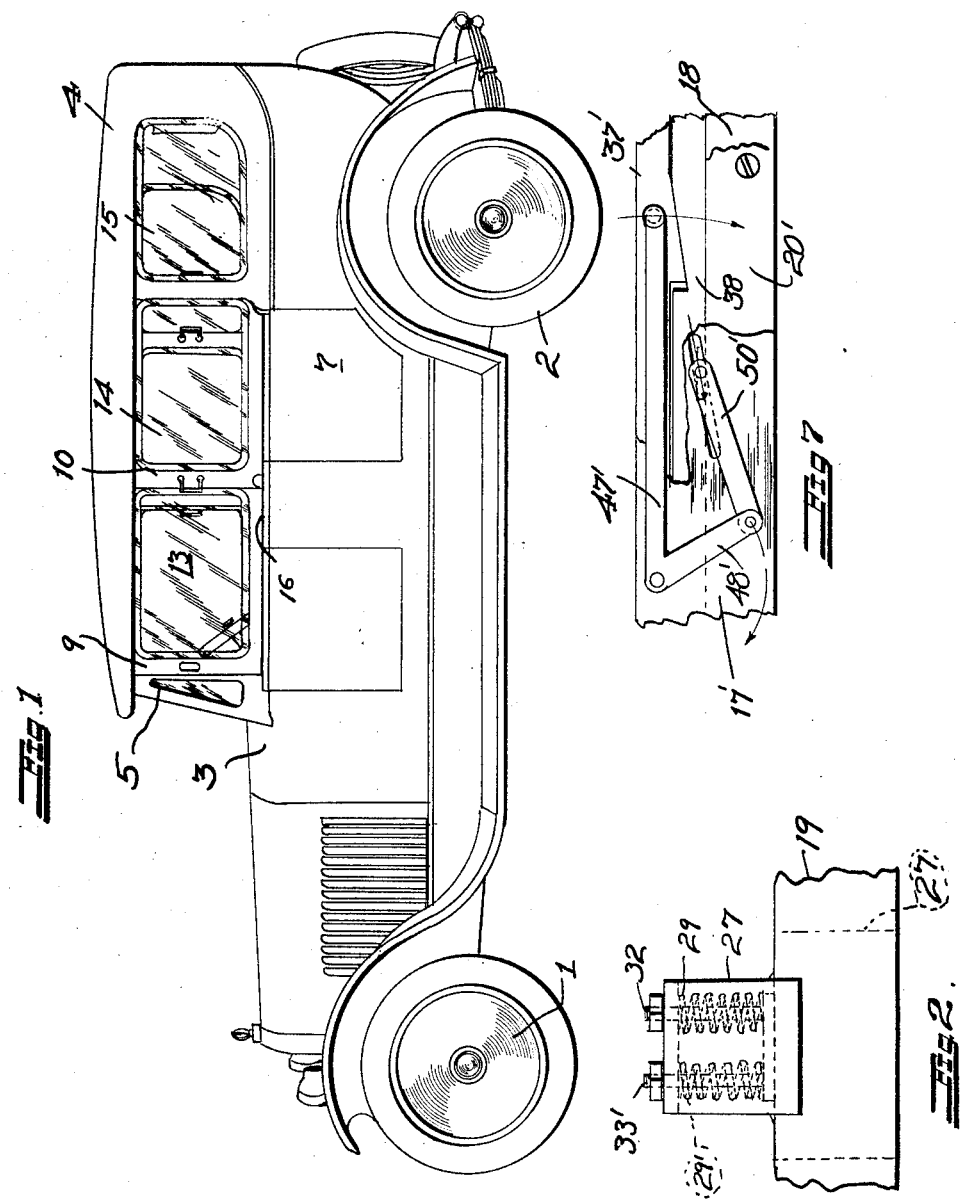
INVENTOR.
Leo Gillig.
Chester Gillig.
BY Carlos P. Griffin
ATTORNEY.

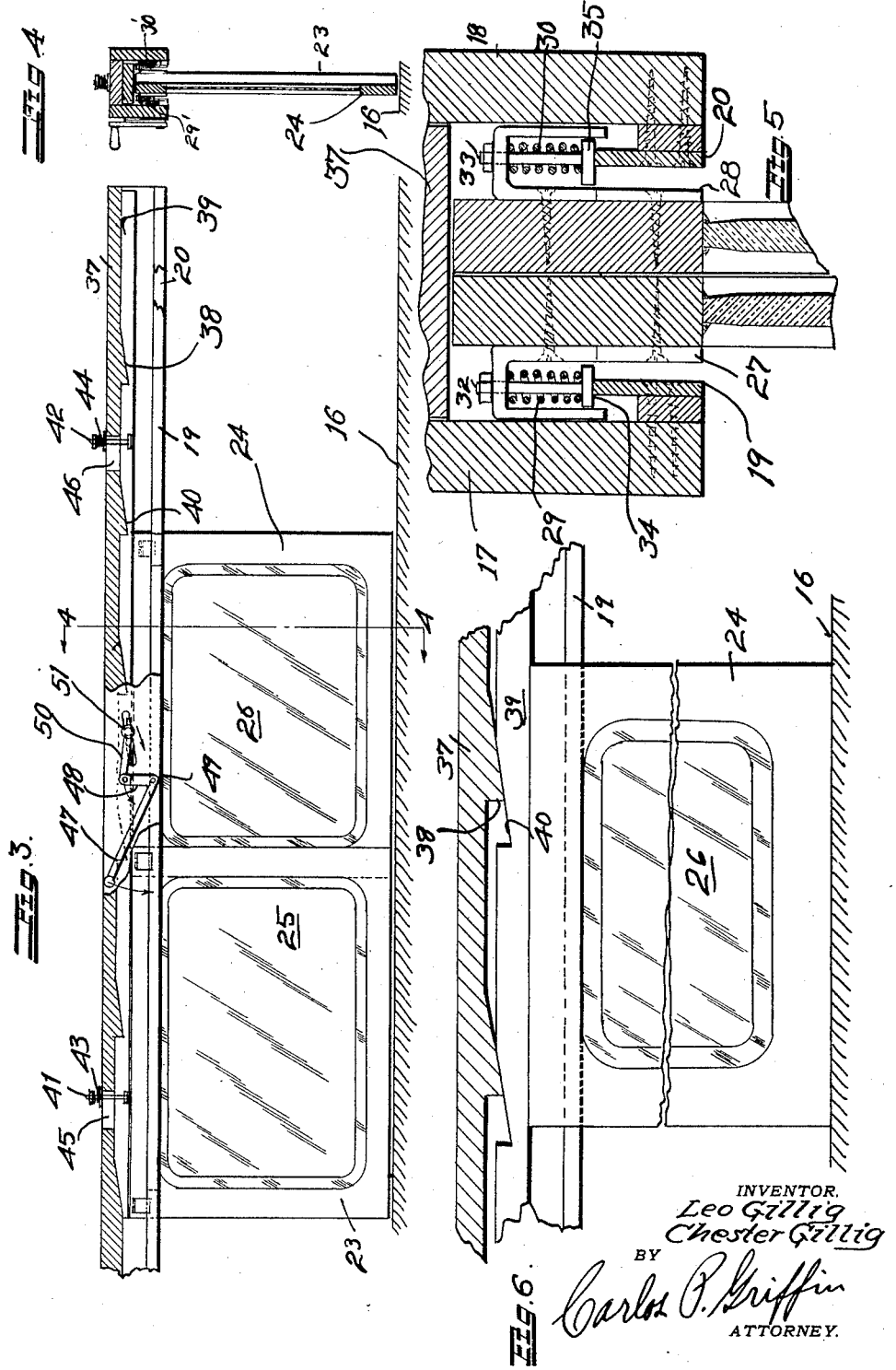

Patented Feb. 7, 1928.

1,658,595

UNITED STATES PATENT OFFICE.

LEO GILLIG AND CHESTER GILLIG, OF SAN FRANCISCO, CALIFORNIA.

SLIDING WINDOW FOR MOTOR VEHICLES.

Application filed July 19, 1921. Serial No. 485,893.

This invention relates to the sliding windows of a motor vehicle, and its object is to provide means whereby the sliding windows may be made tight and rattle-proof at any position they may occupy, whether one window or both on a side happens to be fully or partially extended, the locking means securing both windows against rattling in any of said positions.

Another object of the invention is to provide means whereby the windows will be sufficiently raised off the lower track when the locking means is released to make them work easily.

Another object of the invention is to provide a construction which will enable all of the windows to be made alike and applied to any given series of machines without special fitting, the movement of the locking mechanism being sufficient to take up all differences in size between any two frames of a kind and all of the windows of a given size.

It will be understood by those skilled in the art that in the production of sliding windows for automobiles, the fitting of the windows to each individual top and body is a large item of expense, so that any means which will enable this fitting to be dispensed with and permit the use of windows all of one size, will result in considerable savings.

Another object of the invention is to provide means within convenient reach of persons in the front seat or in the back seat of the automobile to lock the windows in any desired position.

Another object of the invention is to provide a construction that will secure the window against rattling by having the window supporting springs stiff enough to hold the window very securely against the supporting rail whenever the window is pushed down by the locking mechanism.

Other objects of the invention will appear as the description proceeds.

An embodiment of the invention is shown in the accompanying drawings in which the same reference numeral is applied to the same portion throughout but we are aware that there may be modifications thereof.

Fig. 1 is a side elevation of an automobile having these sliding windows applied thereto.

Fig. 2 is a side elevation of the window hanger.

Fig. 3 is a sectional view through a portion of the automobile body and through the locking mechanism showing its operation.

Fig. 4 is a section on the line 4—4 Figure 3 looking in the direction of the arrows.

Fig. 5 is an enlarged sectional view similar to Figure 4.

Fig. 6 is a view showing the position the window occupies when the lock pushes it down to secure it in any given position, and Fig. 7 is a side elevation of a modified form of locking lever.

The numerals 1 and 2 indicate the wheels of the vehicle; 3 indicating the body and 4 the top. The top has the usual window shield front 5, and the fixed side portions of the top extend to the rear of the back door 7.

On each side of the vehicle there are two windows with stiff frames 9 and 10. Any suitable material such as hyaline or glass if desired may be used in place of the members 13, thus giving the window 9 an intermediate window 14 and a fixed rear window 15.

On the upper edge of the outer portion of each side of the automobile body there is a track 16 over which the windows pass, and within the top there are formed two tracks 17 and 18; the latter two tracks in turn support two steel tracks 19 and 20.

The windows consist of two rectangular frames 23, 24 which have glass or pyralin sheets 25, 26, filling their openings. The upper rail on each window as shown in Figure 5, is provided with an inverted U-shaped hanger 27 and 28. This hanger holds the window normally on the springs 29, 30; bolts 32, 33 passing through said springs and having shoes 34, 35 which rest upon the rails 19, 20, and when not compressed are stiff enough to lift the windows out of contact with the guide 16, as indicated in Figure 3. There is a pair of shoes 34, 35 for each side window.

The rails 17 and 18 are installed just inside the lower edge of the top, and they are connected by means of a longitudinal member 37 extending from one to the other, and which member is supplied with wedge-shaped surfaces as indicated at 38 in Figure 3. A long rail 39 extends longitudinally between the two rails 17 and 18 and it has a plurality of wedge notches 40, which notches match with the wedges 38 on the rail 39 when the rail is in its normal position. The rail 39 is held in place by means of two bolts 41, 42 each of which bolts is raised by means of a spiral spring as indicated at 43, 44. The bolts 41, 42 are slidable longitudinally along two slots 45, 46, and when the rail 39 is moved to the left Figure 3, it will be pushed down by the wedges 40 into contact with the windows and will push them down against their bottom slide 16. Just inside the lining of the top, and within reach of the persons in the front and rear seats is a bell crank lever 47 pivotally mounted on the lower part of each inner rail of the top, as indicated at 49, and each bell crank has a forwardly extending member 48 pivotally connected to a link 50 which in turn is pivotally connected to the slide 39 by means of a pin 51.

The operation of the apparatus is as follows: Assuming the rails 19 and 20 on each side of the vehicle to extend from the windshield to a position in the fixed portion of the top far enough to the rear to accommodate the length of the two front slides, they will be locked in that position by pulling down upon the lever 47. This will force the rail 39 into contact with both windows and will compress the springs 29, 30 and force both windows into contact with the lower rail 16. This pressure will be sufficient to hold the two windows rigidly in position and prevent them from rattling when the car is running.

When the slide 39 is released from the windows, its springs 43, 44, automatically lift it and the springs 29, 29′ and 30, 30′ lift the windows off the rails 16, thereby permitting the windows to be easily moved forward and in whatever position they may be placed they may be locked by the movement of the slide 39.

If the position of the locking mechanism shown in Figure 3 is not convenient, the lever 47 may take the form shown in Figure 7. In this figure the inner member carrying the rail for the windows to slide on is indicated at 17′, the outer rail at 20′ and the outer depending member to which the rail is secured at 18′. The fixed top member to which the side members 17′, 18′ are secured is indicated at 37′ and the bell crank lever at 47′. This lever has the depending arm 48′ and it is connected to the slide 39′ by means of the link 50′.

What we claim is as follows, but various modifications may be made in the construction shown in the drawings and above particularly described form, within the purview of our invention.

1. A sliding closure construction comprising tracks extending alongside of each other, hangers slidably mounted on the respective tracks, closures connected with the respective hangers, a movably mounted operating member, and means operatable by the last member to simultaneously engage the upper edges of all of the closures and tighten the hangers upon the tracks.

2. A sliding closure construction for automobile tops comprising track hangers slidably mounted thereon, closures connected with the hangers, a slidably mounted operating member, a pivotally mounted lever to move said slidable member longitudinally, means carried by the slidable member to engage a fixed part of the automobile to cause the upper edges of all the closures to be locked in a given position upon the track.

3. A sliding closure construction for automobile tops comprising a fixed track, spring hangers slidably mounted on the track, closures connected to the hangers, a plurality of fixed wedges carried by the top, a slidably mounted operating member carrying a set of reversibly mounted wedges to cooperate with the first mentioned wedges, and means to move said slidable member and its wedges longitudinally to secure all the closures simultaneously in a fixed position with respect to the track and top.

In testimony whereof we have hereunto set our hands this 12th day of July, A. D. 1921.

LEO GILLIG.
CHESTER GILLIG.